No. 888,771.

G. A. WETTENGEL.
DOUBLING MACHINE.
APPLICATION FILED SEPT. 19, 1906.

PATENTED MAY 26, 1908.

No. 888,771. PATENTED MAY 26, 1908.
G. A. WETTENGEL.
DOUBLING MACHINE.
APPLICATION FILED SEPT. 19, 1906.

Witnesses:
Alex. Jackson.
Robt B. Whitacre Jr.

Inventor,
George Alexander Wettengel
By H. M. Plaisted
his Atty.

No. 888,771.

G. A. WETTENGEL.
DOUBLING MACHINE.
APPLICATION FILED SEPT. 19, 1906.

PATENTED MAY 26, 1908.

No. 888,771. PATENTED MAY 26, 1908.
G. A. WETTENGEL.
DOUBLING MACHINE.
APPLICATION FILED SEPT. 19, 1906.

Witnesses:
Alex. Jackson
Robt B. Whitacre Jr.

Inventor,
George Alexander Wettengel,
By H. M. Plaisted,
his Atty.

No. 888,771.

G. A. WETTENGEL.
DOUBLING MACHINE.
APPLICATION FILED SEPT. 19, 1906.

PATENTED MAY 26, 1908.

Witnesses:
Alex. Jackson,
Robt B. Whitaers Jr.

Inventor,
George Alexander Wettengel
By H. M. Plaisted,
his Atty.

No. 888,771. PATENTED MAY 26, 1908.
G. A. WETTENGEL.
DOUBLING MACHINE.
APPLICATION FILED SEPT. 19, 1906.

Witnesses
Alex Jackson,
Robt B. Whitacre Jr.

Inventor
George Alexander Wettengel,
By H. M. Plaisted
his Atty.

UNITED STATES PATENT OFFICE.

GEORGE ALEXANDER WETTENGEL, OF ST. LOUIS, MISSOURI.

DOUBLING-MACHINE.

No. 888,771.     Specification of Letters Patent.     Patented May 26, 1908.

Application filed September 19, 1906. Serial No. 335,279.

*To all whom it may concern:*

Be it known that I, GEORGE ALEXANDER WETTENGEL, a citizen of the United States, residing at 4409 North Fourteenth street, in the city of St. Louis and State of Missouri, have invented certain new and useful Improvements in Doubling-Machines, of which the following is a specification, reference being had therein to the accompanying drawings.

My invention relates to certain new and useful improvements in doubling machines, and its object is to fold in the center, and trim the longest sheets possible from a pack.

To this end my improvements have reference to an automatic shifting mechanism for the pack, to locate the folding line; have reference to electrical operative means for said shifting mechanism; have reference to an auxiliary folder for the folding table; have reference to a cam-operated, electromagnetic friction clutch; have reference to lifting and shearing mechanisms coöperating with said shifting mechanism; and have reference to other features hereinafter described and claimed.

In the accompanying drawings on which like reference letters indicate corresponding parts: Fig. 2, a side elevation; Fig. 2$^a$, a sectional detail of the swinging frame; Fig. 2$^b$, a detail of the operating rack and gear for the lateral gage; Fig. 3, an end elevation; Figs. 3$^a$ and 3$^b$, detail plan and side views respectively of the lateral gage and adjacent parts, the section being taken on the line X—X, Fig. 1; Fig. 4, a vertical section on E—F, Fig. 6. Fig. 4$^a$, detail face and sectional views of a circular switch. Fig. 4$^b$, detail end and sectional views of a dove-tail guide; Fig. 4$^c$, a sectional detail showing insulation for a hanger; Fig. 4$^d$, a similar view of a stand; Fig. 5$^a$, a detail showing insulation mounting; Fig. 6, a horizontal section on I—J, Fig. 4; Fig. 6$^a$, a diagram of wiring for the circuit breaker and the swinging frame; Fig. 7, a vertical section on G—H, Fig. 6, with table leaves in vertical position, just prior to the squeezing operation of the auxiliary folder; Fig. 7$^a$, a face view of a double disk switch; Fig. 7$^b$, a central section of Fig. 7$^a$; Fig. 13, a sectional plan of the gage feet when tallying with the pack contour, their clamping magnets, and adjacent parts.

In the manufacture of tin plate, the sheet bars are given five or six passes through the rolls, then two of them are put together and rolled till they are about 5 ft. long; then they are doubled over and sheared, making a set of four sheets in thickness which is called a "pack". This pack is then passed through the rolls until it is about 5 ft. long, when it is doubled and sheared again. Then it is rolled to the required length. These packs vary in length and the ends are not straight, but usually are hollow in the center at one end and rounding at the other. When these oppositely curved ends are brought together in the operation of doubling, they do not match of course, and it is the aim of the workman so to double the pack that only enough to square the doubled ends need be sheared from the pack. That which is sheared off is "scrap", and the amount varies according to the skill of the workman in folding the packs and matching up the doubled ends. By my improvements the folding line is accurately located, the doubling securely and properly effected, and the scrap is reduced to a minimum.

Figures 3, 5A, 5B:
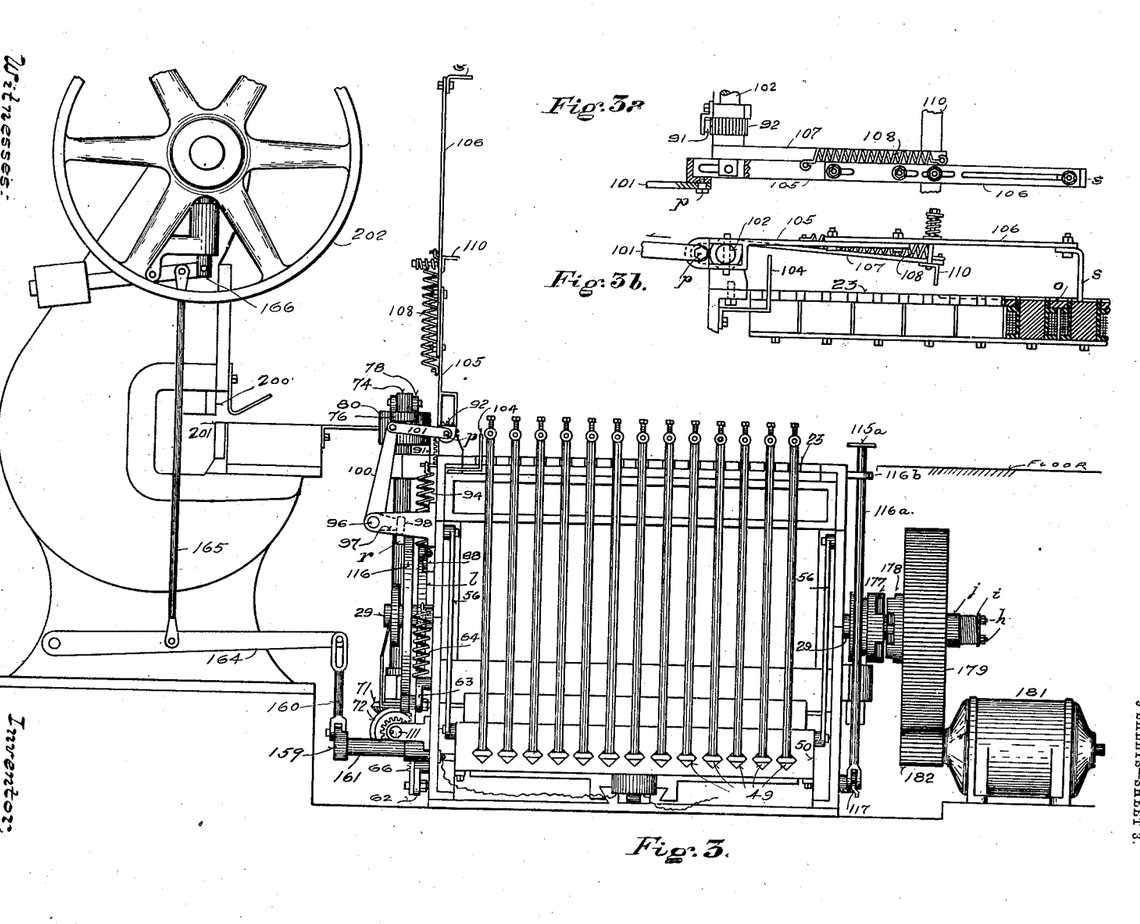

For convenience in handling the pack, the table of my machine is on a level with the floor, as indicated in Fig. 3. The pack is pushed upon the table by the workman, who then starts the machine, after which it continues automatically till the scrap is sheared off. First, the pack is trued up laterally; then it is centered and shifted on the table, then it is held securely, the ends are brought together and the loop is squeezed flat; then the doubled pack is moved a pre-determined distance and the doubled ends are sheared off.

Figure 1:
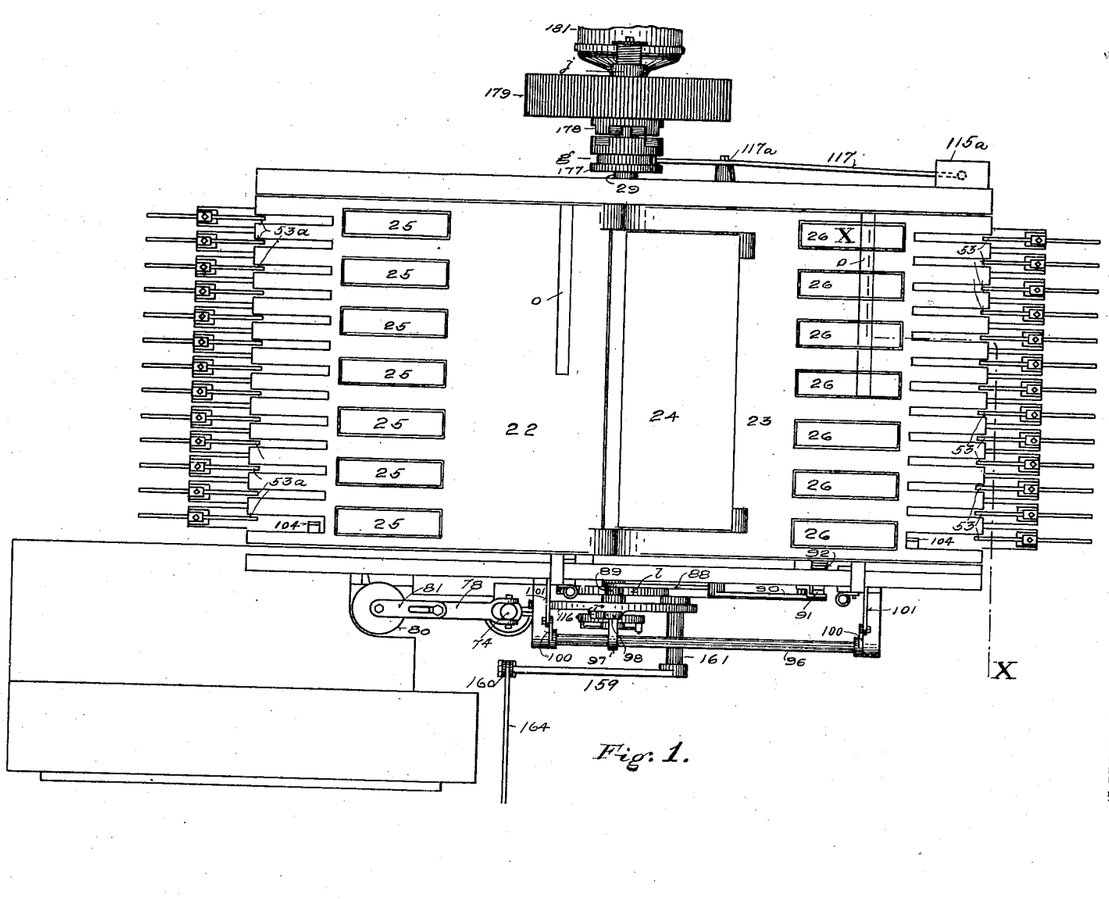
Figure 1 represents a top view of a machine exemplifying my improvements.
Figures 8, 9, 10, 11, 12:
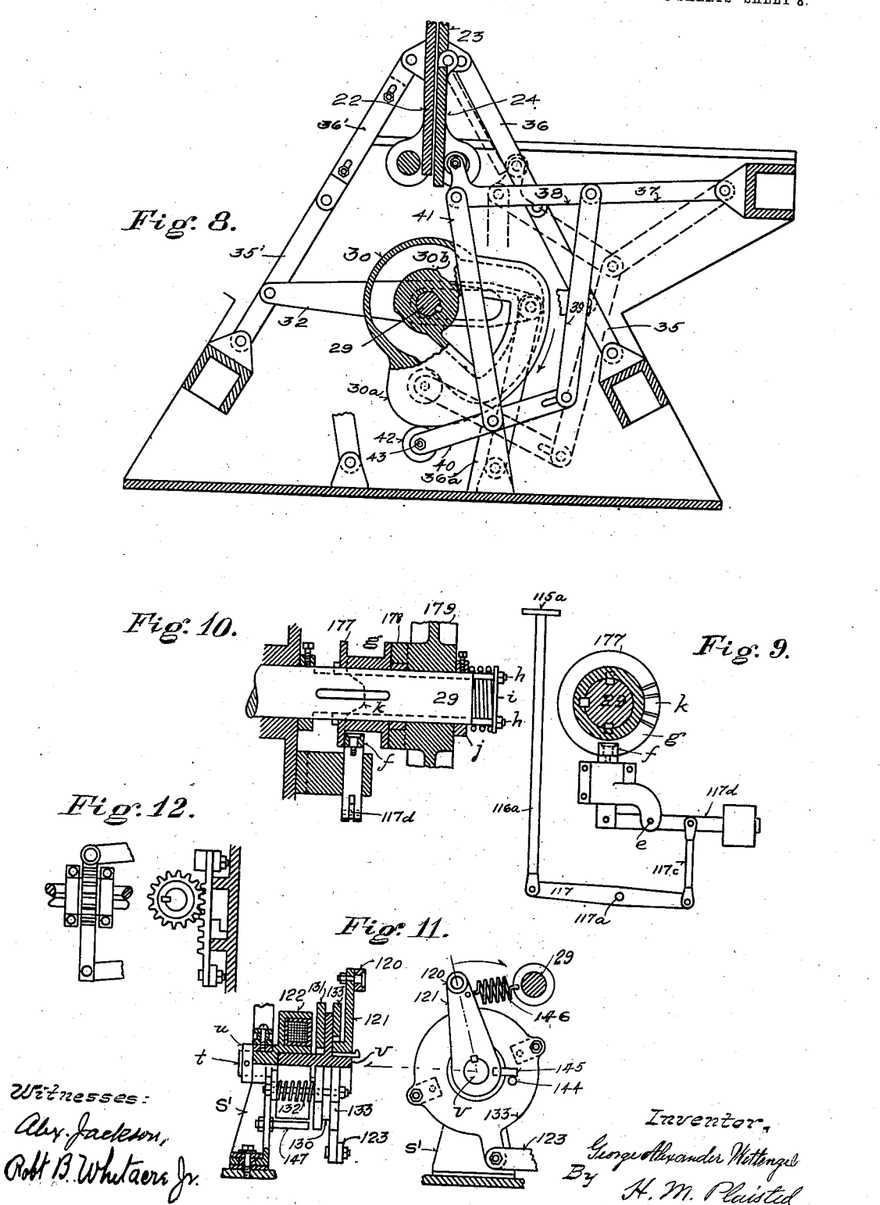
Fig. 8, a sectional view supplementing Fig. 7, showing the auxiliary folder and its operative mechanism.
Fig. 9, a detail of the starting treadle and clutch.
Fig. 10, an enlarged sectional view of the starting clutch of Fig. 9.
Fig. 11, detail face and sectional views of the electro-magnetic friction clutch.
Fig. 12, detail views of a swinging rack and enmeshed gear.
Figure 15:
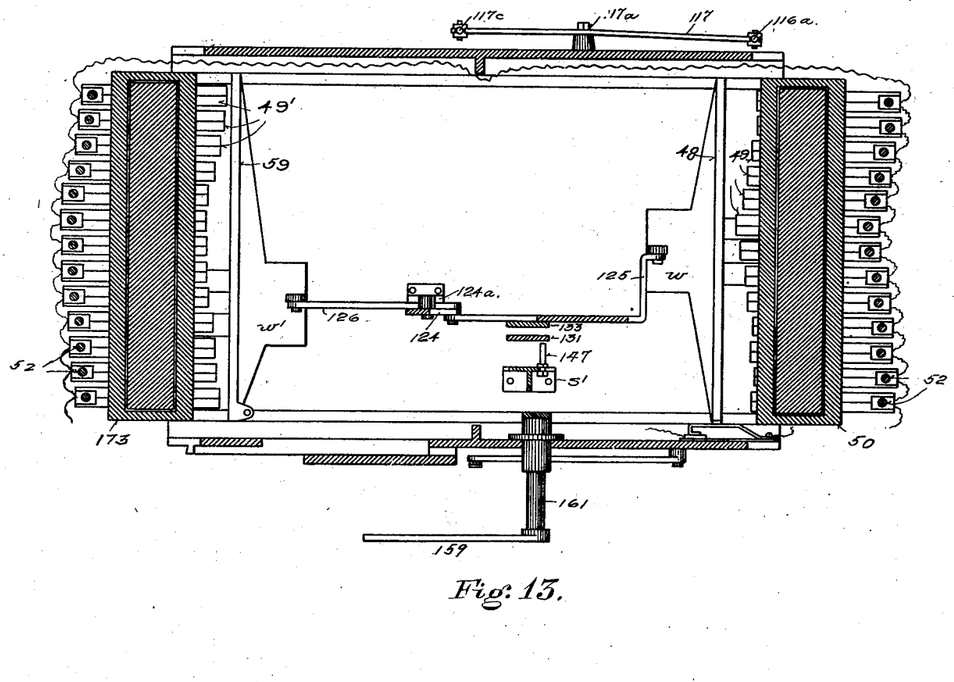

I will now describe the mechanism I employ to effect the above operation, but do not confine myself to the particular construction shown herewith: First, the pack is pushed upon the table against the stops 104, (Figs. 1 and 3). Then to start the machine the workman tramps on the treadle plate 115$^a$, at the top of a vertical rod 116$^a$, (Figs. 9 and 3) mounted in a guide 116$^b$, and pivoted at the lower end to a lever 117, fulcrumed at 117$^a$, and connected at the other end by a link 117^c, to a weighted lever 117^d, fulcrumed at e and having a roller pin f engaging a groove g (see Figs. 9 and 10) in a clutch collar 177, feather-keyed to a main shaft 29, bearing a matching clutch 178 on the hub of a main gear 179, that is loosely mounted on said shaft and is driven by a pinion 182, Fig. 3, of a motor 181, or otherwise. A pair of pull bars h are slidingly mounted in parallel grooves on opposite sides of the shaft 29, and have turned-out ends that form hooks that engage the said clutch collar 177. The other ends of the bars pass through a plate i that bears on a coil spring that presses against a set collar j,—thus putting said bars in tension and tending to effect operative engagement, as shown in Fig. 10, of the said gear 179 and the main shaft 29. Disengagement is effected automatically by the boss k meeting the said roller f, thus opening the clutch and stopping the shaft 29 after one revolution. The cycle of operation takes place during one revolution of this main shaft 29, and the parts return to their starting position. Fixed to said shaft 29 is a cam disk l (Figs. 1—2), having a notch m into which drops a roller 89 mounted on the side of one end of a lever 88, fulcrumed at n and acted on by a coil spring 94 that also raises a rack 91 connected to said lever 88, and guided by a pivoted link 90, or otherwise. This rack 91 meshes with a gear 92, keyed to a horizontal shaft 102 mounted in boxes 93 and having arms 107 carrying a hold down bar 110 (normally elevated as in Fig. 2) that is dropped on the pack by the rotation of the shaft 102—(see Fig. 3^b). On the ends of this shaft 102 are mounted the lateral gages each consisting of a two-part bar 105 and 106 (see Figs. 3^a–3^b) adjustably bolted together, and having a gage s adjustably fastened by slot and bolt or otherwise, and extending below the bottom sheet by entering a groove o in the table. The inner end 105 of the gage bar has a slot and pin connection (Figs. 3^a–3^b) with the end of the shaft 102, allowing of a transverse movement (across the table) of the bar, to pull the irregularly disposed sheets sidewise into line, and even up the pack laterally between the side gages 106 and 104. This transverse movement is effected preferably, by oscillating a shaft 96, parallel to shaft 102, through a crank 100 and link 101 at each end, connecting it with the slotted end of the gage bars which are partly shrouded (Fig. 3^b) in order to bring the link pivot p into the axis of the shaft 102 when in normal position, Fig. 3. The tension spring 108 connecting the bar 105 and arm 107, tends to pull the gage bar up against the shaft end 102 as shown in Fig. 3. A rocker arm 97 fixed to shaft 96, Fig. 1, has on its end a roller 98, lying in the path of a tooth r on a disk cam 116, which raises it and drops it, thus rocking the said shaft 96, its crank arm and link connection aforesaid, to effect the transverse movement of the gage end 106 and draw the pack sheets laterally against the fixed gage 104, as above stated. The pack must now be centered, and this is effected through the end gages.

Figures 1, 4A, 4B, 4C, 4D:
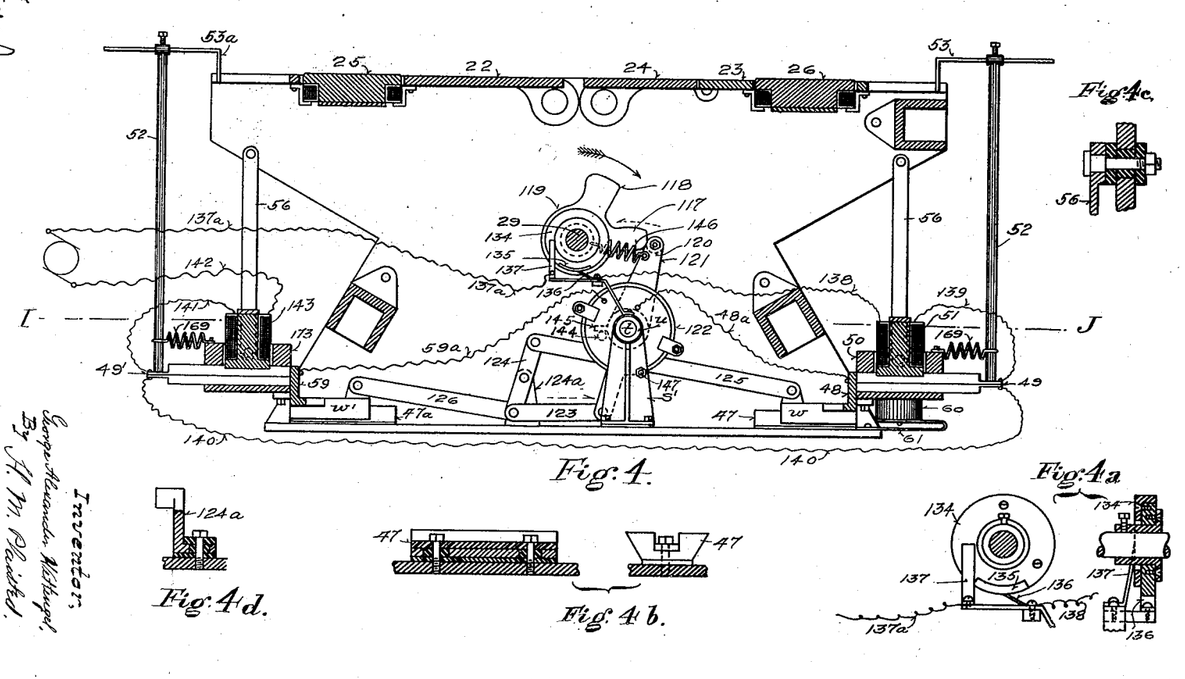
Figures 6, 6A:
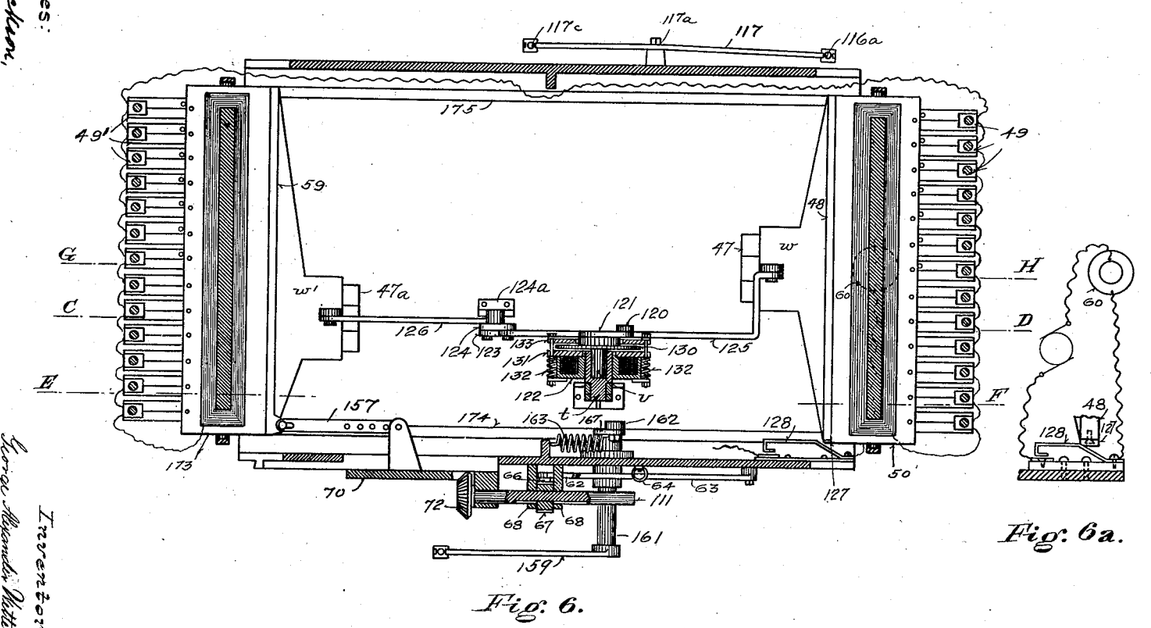

Referring to Figs. 1 and 4, I show a series of gages 53 and 53^a, for the ends of the pack, similar to the side gages 106. The bent down ends extend below the table into slots or otherwise, to catch the bottom sheets in the pack. Each of these gages is adjustably mounted in the top of a vertical standard 52, carried by a corresponding foot 49, (49') mounted so as to move independently in horizontal angular guides in opposite frames, 50 and 173, (Figs. 2–2^a) which are hung by links 56, pivoted to the frames and to the sides of the machine, or otherwise mounted to allow a substantially horizontal movement of the frames and the end gages supported thereby. Each gage tends to move inward independently by the tension of its spring 169 (Fig. 4) connecting the standard and frame. Each set is held out (and the end gages held open) at the start by slide bars 48 and 59, Fig. 4, the operative connections of which I will now describe. These slide bars (48—59, Fig. 4, and Fig. 6 where they are shown in plan) have a vertical flange opposing the angular sliding feet of the end gage standards, and a dove-tailed base (w—w') by which each is mounted on its respective guide (47—47^a, Figs. 4–4^b), secured to the bottom plate of the machine but insulated therefrom. Links 125—126 are pivoted to their respective slide bars and to a double crank lever 124 mounted in a bracket stand 124^a, insulated from the base of the machine (see Fig. 4^d). In order to actuate this link work properly, I provide a friction clutch with magnetic release which I will now describe: Referring to Fig. 4 and the enlarged detail, Fig. 11,—the bracket box s' is insulated from the base, and supports a shaft t held by a set collar u, and carrying a core-case 122 containing a coil forming an electro-magnet wired by 48^a and 59^a, to the slide bars 48 and 59 respectively. (In Fig. 11, the face view is the reverse of that shown in Fig. 4). The core case is preferably bored to form a socket bearing in the center for a crank shaft v having a crank 121 with a roller 120 that is drawn by a spring 146 into the notch between lobes 117 and 118 of a quadrant cam 119, mounted on the shaft 29. A disk flange 130, Fig. 6, fixed to the crank shaft, is clutched, (preferably by friction,) between two disks 131 and 133, loosely mounted on said crank shaft, and having rods passing through said disks and lugs on the core case, on which rods are mounted springs 132 in compression which exert a clamping pressure on the disk flange 130. The said disk 133 has an arm by which a pivoted link 123 connects it to the double lever 124 aforesaid. The link-connected disk 133 and crank 121, normally clutched together by frictional engagement, therefore form a double crank for drawing the slide bars inward through their link connections, when said roller 120 enters said notch in cam 119. This inward movement of the slide bars allows the sliding feet aforesaid to slide inward also, until the gages 53—53ª touch the irregular ends of the pack. The feet then assume a curve at each end, as shown in Fig. 13, that is a duplicate of the shape of the ends of the pack.

To keep the swinging frames steady as the sliding feet move inward as above described, I preferably use an electro-magnet 60 (Figs. 4–6) supported on a spring 61 below the frame. This magnet is in circuit with a dynamo (Fig. 6ª) or other source of electricity, and has a circuit breaker spring 128 normally open, but closed by the first inward movement of the sliding bar (48). An insulation piece 127 on the end of bar 48 clears said spring when the bar is in its extreme outward position, but closes the circuit and energizes the said magnet when the bar is drawn inward by the roller entering the notched cam 119, as previously described. Some other form of steadying device may be used, or it may be dispensed with, if preferred. As the said cam 119 continues to rotate in the direction of the arrow, Fig. 4, the roller 120 begins to rise out of the said notch and reverses the link work. A circular switch now comes into action, consisting of a circular switch plate 134 (Fig. 4–4ª) on the shaft 29, having an insulated portion 135, so that one brush 136 slides off said insulation and (the bars 48 and 59 being drawn inward out of contact with the feet) closes the circuit through another brush 137, the wire 137ª, through the dynamo, through wire 142, magnet 143, wire 141, wire 140, wire 139, magnet 51, wire 138 back to the other brush 136 now in contact with the same plate as brush 137. The bottom of the last named magnets (51—143) have notches (Fig. 2ª) matching the sliding feet, so as to clamp them firmly in their guides when the circuit is closed as above described. The sliding feet, and the gages carried thereby, therefore maintain their curved adjustment (Fig. 13) until released.

While cam 119 continues to turn the magnet case and friction clutch by the said crank 121, the slide bars (48 and 59) are forced outward by the link work aforesaid, until one of them comes in contact with that one of the clamped feet (49′ Fig. 13 for example) that projects inward the furtherest. Since the feet (49—49′) are clamped in the swinging frames (50—173) which are coupled by side rods 174—175, Fig. 6, the aforesaid outward symmetrical movement of the sliding bars will swing the swinging frames horizontally to the left, i. e. towards the end which has the innermost projecting foot. The pack above, being held between the end gages, will also be moved endwise on the gages, till the innermost foot (49′) on the table, on the opposite side—the right in this example,—also contacts with the bar 48 on the right. When this occurs, the pack on the table above is centered. Now the bars have made contact with one foot on each side, and the circuit is now completed through the foot 49, wire 139, magnet 51, wire 138, brush 136, switch plate 134, brush 137, wire 137ª through generator, wire 142, magnet 143, wire 141, foot 49′, bar 59, wire 59ª, magnet 122, wire 48ª, to bar 48 again. The current energizes magnet 122 and draws disk 131 over against pin 147 and the magnet, thus holding the magnet in place and freeing the clutch on disk 130, which allows the crank 121 to continue its stroke under the constant rotation of the cam 119.

Figures 2, 2A, 2B:
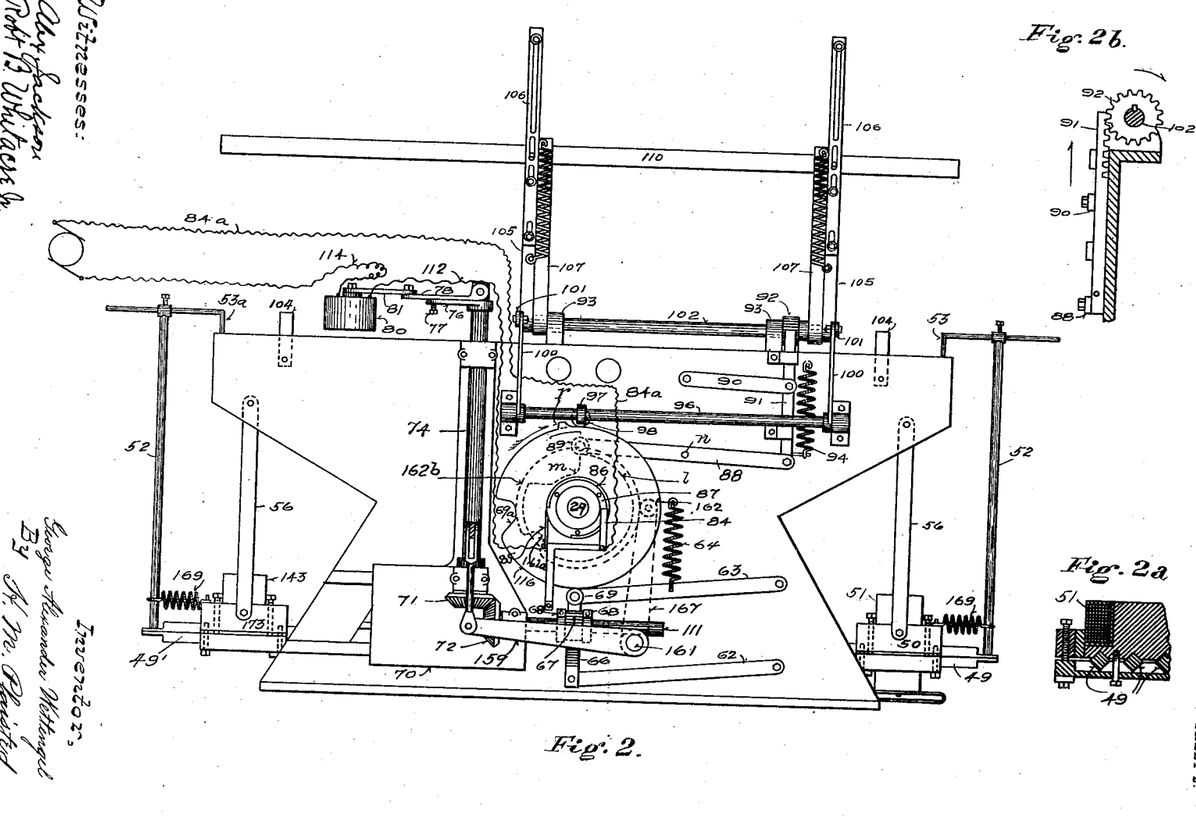

The circuit is broken by switch 134 turning the insulated portion 135 over brush 136. This clamps disk 130 and crank 121 so that the lobe 117 of cam 119 forces the roller 120 to the end of its stroke. This brings the gages to their extreme outer position through the link work. This takes place just after the last operation which is shearing, and opens the end gages ready for the next pack put on the table. The links 56 are insulated as shown in Fig. 4ᶜ. The pack being now centered is ready to be doubled, but first the hold down bar 110 is raised again to the upright position by the left side of the cam notch m, Fig. 2, acting on the said roller 89 that previously entered that notch over the right hand side to lower the bar 110 at the beginning. By lifting the roller end of the lever 88, the rack 91 Fig. 2ᵇ, is pulled down, thus rotating the pinion over towards the left, and lifting the arms and bar thereon. After passing the projection 118, the spring 146 forces crank 121 back until pin 145 stops against pin 144 and is held there.

The table consists of two main leaves 22—23, Fig. 1, hinged by adjacent edges or otherwise adapted to fold at the center of the machine. A third leaf or table portion is preferably provided, for example, one leaf, the right, has a portion 24 cut out of the hinge side, and hinged by its outer edge, or otherwise supported, so as to form an auxiliary folder for squeezing flat the loop of the pack.

Figure 5:
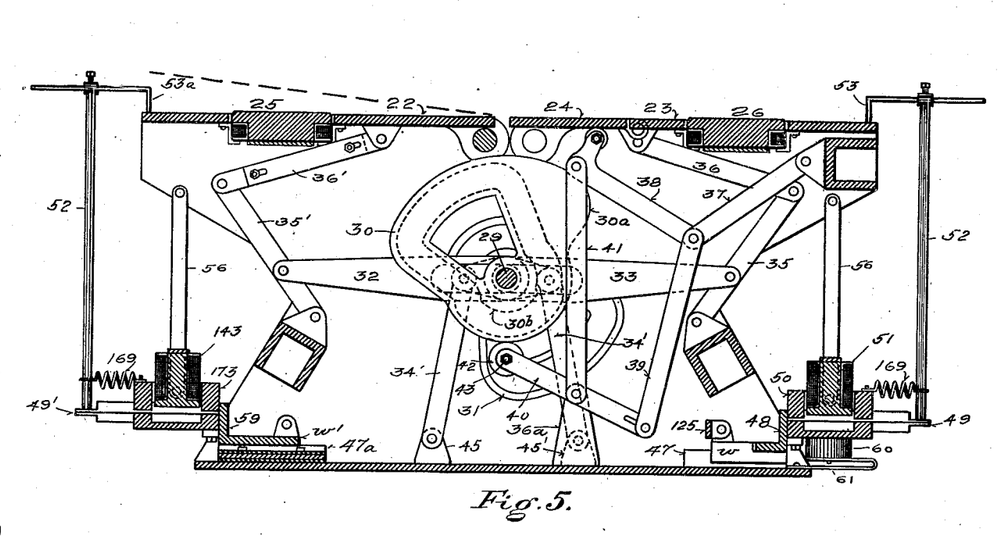
Fig. 5, a vertical section on C—D, Fig. 6.
Figure 5A:
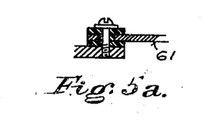
Figures 7, 7A, 7B:
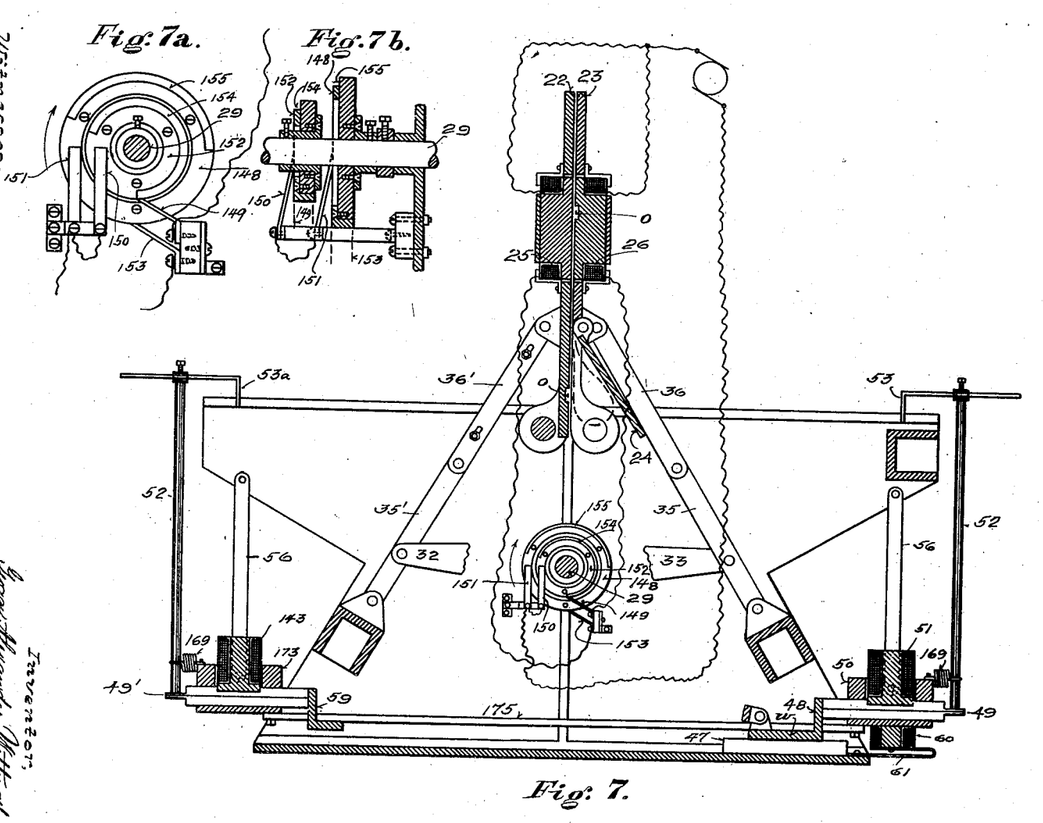

The preferred operative means for the folding table consists of two cam lobes 30—31, Fig. 5, mounted on the shaft 29 in opposite disposition, and separately connected to corresponding leaves. These key-hole shaped lobes have face grooves in which are operated a pair of rollers respectively mounted on the ends of a pair of oppositely extended slotted bars 32—33, Fig. 5, embracing shaft 29, and each pivoted at its outer ends to a pair of connected links 35—36 and 35'—36', pivoted at their bottom ends in suitable foot brackets, and at their upper ends to their respective main leaves, whereby they act with a grasshopper toggle movement to raise the leaves and bring them together with increasing power, as the links straighten out as shown in Fig. 7. The said slotted bars have chiefly a horizontal movement, but slightly oscillatory at their outer ends, and are preferably supported at their roller ends by swing links 34—34', pivoted to said bars and to blocks 45—45' respectively. Other forms of support for the slotted bars may be employed.

When the main leaves are raised as in Fig. 7, the center of the pack lies partly folded in a loop next to the auxiliary folder, as dotted in Fig. 7. The auxiliary leaf 24 is operated by a swelled portion 30ª of lobe 30 (Figs. 5—8) that engages with a roller 42, mounted by a pin 43 on a lever 40, fulcrumed in a block 36ª, and connected to said auxiliary leaf 24 by links 38—39, controlled by links 37—41. Fig. 5 shows the links when table is open, and Fig. 8 when in its squeezing position. By this auxiliary leaf the loop is squeezed flat while the ends of the pack are held pressed together, thus preventing slipping and securing accuracy and completeness in doubling.

In order to prevent the pack sliding out of center again as the leaves are raised, I provide holding means, preferably consisting of two series of electro-magnets 25—26 preferably mounted in suitable openings in said leaves and forming part of the surface of the table. These are energized just prior to raising the leaves, by a double switch, (Fig. 7—7ª—7ᵇ) consisting of two disks of insulating material, such as wood fiber, separately mounted adjacent to each other on the shaft 29. One disk is smaller than the other so that brushes 150—151, electrically connected, can bear upon the rings 152—148, carried by their respective disks. Each ring forms a circle on the face of its disk, with which the corresponding brush is in constant contact; but each is cut away (154—155) for a portion of the outer edges, or otherwise insulated, in order to break connection with two other brushes, 149 and 153, which are mounted in the planes of the respective disks, and are wired independently to their corresponding series of electro-magnets in the table, and thence to the generator, from which a wire leads back to the said brushes 150—151, thus completing the circuit.

In the position of the parts shown in Figs. 7—7ª, the current is closed through both series of magnets, but is about to be broken through the brush 149 and thus cut out the electro-magnets 26 in the right hand leaf 23; the brush 153 will continue for about one quarter of a turn of shaft 29, to energize series 25 in leaf 22, so that upon opening the table the pack will be held on leaf 22. This opening is effected by the double winged cam 30—31, when it turns a little more from the position shown by one wing 30, Fig. 8, (the other wing is omitted for clearness) whereupon the roller on bar 32 will be forced toward the shaft 29 thus throwing the toggle links from their straight position Fig. 8, to their bent position Fig. 5, and lowering the table leaves to their horizontal position again with the pack doubled and lying on energized magnets 25. These last are now cut out by the said brush 153, Fig. 7, meeting the break 155 of the switch 148 (as the quarter turn above mentioned has now been made); both brushes 149 & 153 are now open, and the table magnets are cut out for nearly half a revolution of the switch. These magnets 25 are not cut out until after the magnet 80 has taken hold of the pack, for this reason: some of the steel is very hard, and if released the ends would spring apart and get out of place on the table.

The pack is now to be properly lifted and presented to the shears. This is done by a lifting mechanism which comprises a sliding bracket 70, Fig. 2, mounted on horizontal guides on the main frame, and connected by an adjustable link 157, Fig. 6, to the left hand sliding bar 59 that shifts the swinging frame. A pair of matching bevels 71—72, Fig. 2, are mounted on vertical and horizontal shafts respectively, 74 and 111, which are mounted in boxes on the sliding bracket and on the side frame respectively. The said vertical shaft extends above the table, and carries an electro-magnet 80, by an adjustable arm 81—78, having a pivoted connection with said shaft (Figs. 1—2) to allow of vertical adjustment of said magnet by a supporting arm 76 and set screw 77, Fig. 2. The said shaft 111 has a gear 67, Fig. 2, slidingly mounted thereon by feather-key connection located between two bearings 68, meshing with a vertically movable rack 66, preferably carried by a pair of parallel swinging arms 62 and 63, pivoted to the main frame and having a roller 69 that is held strongly pressed upward against the circular disk cam 116 by a strong spring 64 attached to one arm 63 and to the main frame. A notch 69ª in the edge of said cam, is located about three-fourths of the circumference from the roller, in the starting position of the cam as shown in Fig. 2; into which notch the roller enters radially and comes out of on an inclined face, when the revolution of the cam in the direction of the arrow brings said notch opposite the roller 69. This vertical motion of the rack rotates the said gear 67 and shafts 111 and 74 through the said bevels, and gives a quarter turn horizontally to said magnet 80, thus bringing it to a point above the pack, which is at a predetermined distance from the doubled ends of the pack due to the link connection 157, (Fig. 6) aforesaid, which has adjusted the horizontally sliding bracket 70 according to the centering of the pack by the swinging frame 173, (Fig. 4) that carries the left hand end gages 53ª. This coupling up of the swinging frame with its centering end gages the sliding bar 59 and the sliding bracket 70 carrying the said magnet 80, causes this magnet to take up each of the packs at the predetermined distance from the innermost end gage 53ª, (which is to be the trimming line of every pack), so as to bring this line between the shear blades 200 and 201 Fig. 3, when the pack is lifted by leaf 22, and is then rotated one quarter turn horizontally by the lifting magnet 80, that is returned to its starting position (Figs 1—2 & 3) by the inclined edge of said notch 69ª acting to throw down again the roller 69 and the rack 66.

Before rotating the pack to the shears, in order to make the pack clear the side gage 104 and the end gages 53ª, the leaf 22 bearing the pack is lifted sufficiently by a slight action of the toggle links 35' and 36' and slotted bar 32 Fig. 5, acted on by a raised or swelled portion 30ᵇ (Figs. 5—8). The dotted line in Fig. 5 indicates this movement of the table leaf.

The lifting magnet 80 is energized by a disk switch 87 Fig. 2 (similar to 148 Fig. 7ª); mounted on the shaft 29, and having brushes 84 & 85 bearing on the face and the edge of the disk respectively that are adapted to close the circuit through the magnet 80 and the generator, by the wires 84ª (see Fig. 2), 112 and 114; and to open the circuit by the break 86 in the disk, for about three-fourths revolution. In short, the action is as follows: The magnet 80 is quarter swung above the pack, and is energized; the table leaf 22 is raised slightly bringing the pack against the energized magnet 80 which rises with it by means of the pivotal mounting of its arm with the shaft 74; and is then returned to the position shown in Figs. 1 & 2 swinging the pack to the shears at right angles to the table, with the edges of the pack projecting under the shear knife 200 for shearing. The shear blades are placed so that the distance from the cutting edges to the center of the magnet 80 in its starting position Figs. 1 & 3, is a little less than the distance from the innermost left end gage 53ª to the center of this magnet in its quarter-turned position. This insures the proper trimming of the sheet: i. e., just enough scrap being taken off the front end of the pack to trim the edges square. (The loop end of the pack is trimmed later in another machine.)

The shear blade 200 is operated automatically thus: A roller 162 (Figs. 2 & 6) on the end of a crank 167, is drawn by a spring 163, Fig. 6, into a depression 162ª (Fig. 2) in a cam disk 162ᵇ on the shaft 29, thus rocking a crank shaft 161 (Figs. 1—3 & 6) and crank 159, so as to pull down on the slotted link 160 (Fig. 3) connecting it, by lever 164 and operating rod 165, to the clutch 166 (of any approved form) that actuates the shear blade, through the power wheel 202, to make a down stroke of the said shear blade 200. Thus the cycle of operations on the pack by this machine is completed. It only remains to remove the pack, thus centered, folded and trimmed to the desired length of sheet, and shear the folded end to cut the pack into separate sheets. This last shearing operation, as before mentioned, is done on another pair of shears preferably, and the table is cleared for the next pack; and so on. It is evident that the successive operations of this machine take place in a comparatively short time, and proceed automatically as the revolution of this shaft 29 and the cams fixed thereon, cause one operation after another to begin and end in proper order and sequence to attain the desired object as stated.

Having thus fully described my invention, what I claim as new and desire to secure by Letters Patent is:

1. In a plate doubling machine, the combination with doubling means, of means having an automatic operation for compensating for irregularities at the ends of the plate.

2. In a plate doubling machine, the combination with doubling means, of means for centering a plate having an irregular extremity to solely project the irregular portion of said extremity for trimming purposes.

3. In a plate doubling machine, the combination with doubling means, of means at opposite extremities to compensate for irregular formations at the ends of the plates and project said formations when the plates are doubled.

4. The combination with a plate doubling machine, of slides at the ends thereof provided with heads to extend the area of the engaging terminals thereof, and means for automatically locking the slides against movement.

5. In a plate doubling machine, the combination with doubling means, of mechanism having an automatic operation for centering a plate thereon and to solely project an irregular extremity at one end of the plate beyond a regular extremity at the opposite end of the said plate when the doubling means bends the plate.

6. In a doubling machine, a folding table comprising leaves adapted to fold together, operative means therefor, electromagnets forming part of the surface of said table, and electrical connections for said magnets.

7. In a doubling machine, a folding table comprising two leaves adapted to fold together, electro-magnets carried by said leaves and forming part of their surface, a switch, electrical connections between said magnets and switch, and means to operate said switch in order to cut out the magnets in one leaf while maintaining the current in the other magnets, substantially as and for the purpose described.

8. In a doubling machine, a pair of hinged leaves forming a main folder, an adjacently hinged leaf forming an auxiliary folder, a driving shaft, cams on said shaft, and toggle links connecting said cams and leaves, substantially as and for the purpose described.

9. In a doubling machine, a pair of main folding leaves an auxiliary folding leaf, a driving shaft, cams mounted on said shaft and one cam having a swelled portion, and toggle links connecting said cams and said leaves to operate the main leaves primarily, and then the auxiliary leaf through said swelled cam portion, substantially as and for the purpose described.

10. In a doubling machine, the combination with a driving shaft and a pair of cams oppositely mounted thereon having face grooves, of a pair of hinged leaves 22—23 and an auxiliary leaf 24 forming a folding table, toggle links in pairs respectively engaged to said leaves, and operative connections between said cams and links.

11. In a doubling machine, the combination with a folding table, of an auxiliary folder consisting of a hinged leaf forming part of said table, a driving shaft, a cam thereon, and operative connections between said cam and auxiliary folder.

12. In a doubling machine, the combination with a folding table, of an auxiliary folder consisting of a hinged leaf forming part of said table, a driving shaft, a cam thereon, a pair of toggle links for said hinged leaf, a controlling link engaging one of said links, and a lever engaged by said cam and operatively connected to said toggle links, substantially as, and for the purpose described.

13. In a doubling machine, the combination with a folding table and means to fold it, of an auxiliary leaf 24 hinged to said table near the folding line, toggle links 37—38 for said hinged leaf, a controlling link 41, an operative lever 40, a connecting link 39, and a driving cam having a swelled portion 30$^a$ adapted to operate said lever and links, substantially as shown and described.

14. In a doubling machine, the combination with a folding table and means to fold it, of electro-magnets carried by said table, and electrical connections for said magnets.

15. In a doubling machine, the combination with hinged leaves forming a folding table, of electro-magnets let into said table and forming part thereof, electrical connections for said magnets, and means to fold said table.

16. In a doubling machine, the combination with hinged leaves forming a folding table, and operative means for said leaves, of electro-magnets mounted in said hinged leaves to hold the sheets being folded, a double switch, and electrical connections between said switch, the source of electricity and the electro-magnets, to maintain the current in some magnets while cutting out others, substantially as and for the purpose described.

17. A doubling machine, comprising hinged leaves forming a folding table, toggle links and operative bars for said table, electro-magnets mounted in said leaves to hold the sheets being folded, a driving shaft, a pair of cams and a double switch mounted on said shaft, and operative connections between said cams and bars, and between said switch and magnets, to effect the coöperative action of the parts as the shaft turns, substantially as described.

18. A doubling machine, comprising a folding table, a driving shaft, a cam 30 thereon having a face groove with a jog 30$^b$ and a swelled portion 30$^a$, and operative connections between said cam and folding table, substantially as and for the purpose described.

19. A doubling machine comprising a driving shaft, a folding table, two series of electro-magnets, a double switch consisting of two rings insulatingly mounted on said shaft, having a portion of each edge cut away or insulated, a pair of brushes for edge contact therewith and wired respectively to said magnets, and a pair of brushes, electrically connected, having constant contact with the face of said rings respectively and wired to both series of magnets through a source of electricity.

20. In a doubling machine, the combination with a driving shaft, a folding table, and two series of electro-magnets, of a double switch consisting of two disks of insulating material separately mounted adjacent to each other on said shaft, a pair of rings on said disks having a portion of each cut away or insulated, a pair of insulated brushes having constant contact with said rings and wired to their respective series of magnets, and a pair of brushes, electrically connected, having constant contact with their respective rings and wired to both said series of magnets through a source of electricity.

21. A doubling machine comprising a folding table, a driving shaft, a cam and a circular switch mounted on said shaft, a crank-shaft having a crank engaged by said cam, a disk flange on said shaft, two disks normally clutching said flange, springs acting on said disks, an electro-magnet controlling one of said disks, electrical connections between the magnet, a source of electricity and said switch, and mechanism connected to said disks and operated intermittently by said magnet-controlled clutch.

22. A doubling machine comprising a folding table, a driving shaft, a cam and a circular switch mounted on said shaft, a crank-shaft having a crank engaged by said cam, a disk flange on said crank-shaft, two spring-operated disks normally clamping said disk flange, an electro-magnet axially rotatable with said crank-shaft and controlling one of said disks, electrical connections between said magnet, a source of electricity and said switch, and mechanism connected to said disks and normally operated by said cam through said magnet-controlled clutch.

23. A doubling machine comprising a folding table, a series of gages at each end, a swinging frame having clamping guides for each series of gages, and means to swing said frame with clamped gages and interposed pack lengthwise of said table.

24. A doubling machine comprising a folding table, a series of independent end gages at each end of the table having a normal tendency toward the folding line, horizontally movable feet supporting said gages, a horizontally movable frame having guides for said feet, a pair of sliding bars opposing said feet and simultaneously movable to and from the folding line, clamping means for said feet, and means to operate said sliding bars.

25. A doubling machine comprising a folding table, a series of independently movable end gages therefor, supporting feet for said gages, a movable frame having guides for said feet, an electro-magnet clamp forming part of said guides having electrical connections, and means to move said frame and end gages, substantially as and for the purpose described.

26. A doubling machine, comprising a folding table, end gages movable independently to duplicate the contour of the pack, and a shifting mechanism for said gages and interposed pack.

27. A doubling machine comprising a folding table, end gages movable independently to duplicate the contour of the pack, a shifting mechanism to move the gages and interposed pack lengthwise, and a release device to stop the shifting of the pack at a predetermined point.

28. A doubling machine comprising a folding table, end gages independently movable to and from the folding line, to duplicate the contour of the interposed pack, a shifting mechanism for said gages and pack, and an electric release to stop the center of the pack at the folding line of the table.

29. In a doubling machine, the combination with a folding table and movable end gages for the pack thereon, of a shifting mechanism comprising a set of guides at each end for said gages and interconnected to form a horizontally movable frame, clamping means to hold the gages in their adjusted positions in said guides, a pair of oppositely sliding bars to engage the nearest clamped gage and shift the pack accordingly, and means to slide said bars.

30. In a doubling machine the combination with a folding table and movable end gages for the interposed pack thereon, of a shifting mechanism comprising a set of clamping guides for the gages at each end and connected to form a horizontally movable frame, an electro-magnet with electrical connections to actuate said guides, a pair of oppositely sliding bars symmetrically located with regard to the folding line of said table, and operative means to slide said bars simultaneously, and a release device comprising an electro-magnetic clutch controlling said operative means, and actuated when said slide bars make contact with the innermost gage of each set, substantially as described.

31. In a doubling machine the combination with end gages having angular feet, of a frame having guides for said feet, springs for said gages, hangers for said frame to allow horizontal movement of frame and gages, an electro-magnet in said frame suitably connected to clamp said gage feet in adjusted positions, and means to move frame and gages horizontally.

32. In a doubling machine, the combination with a horizontally swinging frame having guides, gage feet mounted in said guides, and springs to draw said gages inward, of an electro-magnet electrically connected, and a spring support for said electro-magnet adjacent to said frame, substantially as described.

33. A doubling machine comprising a folding table, a series of gages at each end and each consisting of a gage proper, a standard and angular foot, corresponding guides for said feet forming a rectangular frame, clamping means for said feet, supports for said frame to allow substantially horizontal movement thereof, and a centering mechanism to move said frame, clamped gages and interposed pack, substantially as and for the purpose set forth.

34. A doubling machine comprising a folding table, end gages for the interposed pack, a horizontally movable frame with clamping guides for said gages, a shifting bar for said frame and clamped gages, a sliding bracket connected to said shifting bar, an electro-magnet electrically connected and carried by said bracket to take hold of the pack between the end gages at a predetermined distance from one end.

35. A doubling machine comprising a folding table, end gages for the interposed pack, a horizontally movable frame having clamping guides for said gages, a shifting bar, a sliding bracket connected to said bar, a vertical shaft rotatably mounted on said bracket, an electro-magnet and arm supported by said shaft, and means to rotate said shaft and energize said magnet at predetermined intervals.

36. A doubling machine comprising a folding table, a shifting mechanism adapted to center the pack thereon, a lifting mechanism for the pack adjusted in position by the shifting mechanism, a shearing mechanism, a main driving shaft, and operative devices between said shaft and the respective shifting, folding, lifting and shearing mechanisms respectively, to operate the same at predetermined intervals.

37. In a doubling machine, the combination with a folding table, and shifting mechanism adapted to center the pack thereon, of a lifting mechanism comprising a sliding bracket connected to said shifting mechanism, a rotatable vertical shaft mounted in said bracket, a pick up device for the pack and carried by said shaft, and means to rotate said shaft.

38. A doubling machine comprising a table, shifting mechanism for centering the pack thereon, an electro-magnet supported adjacent to the pack, a main driving shaft, a circular switch on said shaft and controlling said magnet, and operative means to move said electro-magnet and pack held attracted thereby.

In testimony whereof I have affixed my signature in presence of two witnesses.

GEORGE ALEXANDER WETTENGEL.

Witnesses:
 M. H. PLAISTED,
 H. M. PLAISTED.